United States Patent [19]

Groh et al.

[11] 4,194,744

[45] Mar. 25, 1980

[54] PHONOGRAPH PICK-UP TRANSDUCER USING A ONE-PIECE BEARING AND INERTIAL DAMPER FABRICATED FROM DIFFERENT MATERIALS

[75] Inventors: Allen R. Groh, Buffalo Grove; Frank J. Karlov, Park Ridge; Lawrence R. Happ, Mundelein, all of Ill.

[73] Assignee: Shure Brothers, Incorporated, Evanston, Ill.

[21] Appl. No.: 874,054

[22] Filed: Feb. 1, 1978

[51] Int. Cl.[2] .................... G11B 3/02

[52] U.S. Cl. .................... 274/37; 179/100.41 M

[58] Field of Search .................... 274/37; 179/100.41 D, 179/100.41 M, 100.41 K, 100.41 Z

[56] References Cited

U.S. PATENT DOCUMENTS

| | | | |
|---|---|---|---|
| 1,996,104 | 4/1935 | Forte | 274/1 R |
| 2,031,948 | 2/1936 | Harrison | 274/1 R |
| 2,328,952 | 9/1943 | Burt | 179/100.41 R |
| 2,476,684 | 7/1949 | Rieber | 179/100.41 R |
| 2,495,934 | 1/1950 | Kondrath | 274/38 |
| 2,498,210 | 2/1950 | Kitgout | 179/100.41 K |
| 2,614,848 | 10/1952 | Kidd et al. | |
| 2,803,713 | 8/1957 | Miller | 179/100.41 Z |
| 3,051,495 | 8/1962 | Wittenberg | 274/37 |
| 3,075,054 | 1/1963 | Cvetko | 274/37 |
| 3,207,857 | 9/1965 | Poutot | 179/100.41 K |
| 3,219,764 | 11/1965 | Pritchard | 274/37 |
| 3,954,273 | 5/1976 | Shaper | 274/37 |

*Primary Examiner*—Steven L. Stephan
*Attorney, Agent, or Firm*—Allegretti, Newitt, Witcoff & McAndrews

[57] ABSTRACT

A magnetic stereo phonograph pick-up cartridge is disclosed. An elongated stylus and an attached permanent magnet are resiliently supported by a molded rubber bearing block which surrounds the magnet and engages under compression with the inner side-walls of a stylus housing sleeve. The molded block is shaped to also serve as a cantilevered inertial damping member which is held in mechanical contact with the magnet. The bearing portion of the block is fabricated from a first material exhibiting high compliance and the inertial damping portion of the block is fabricated from a second material exhibiting high damping characteristics, especially in the high audio frequency range.

6 Claims, 22 Drawing Figures

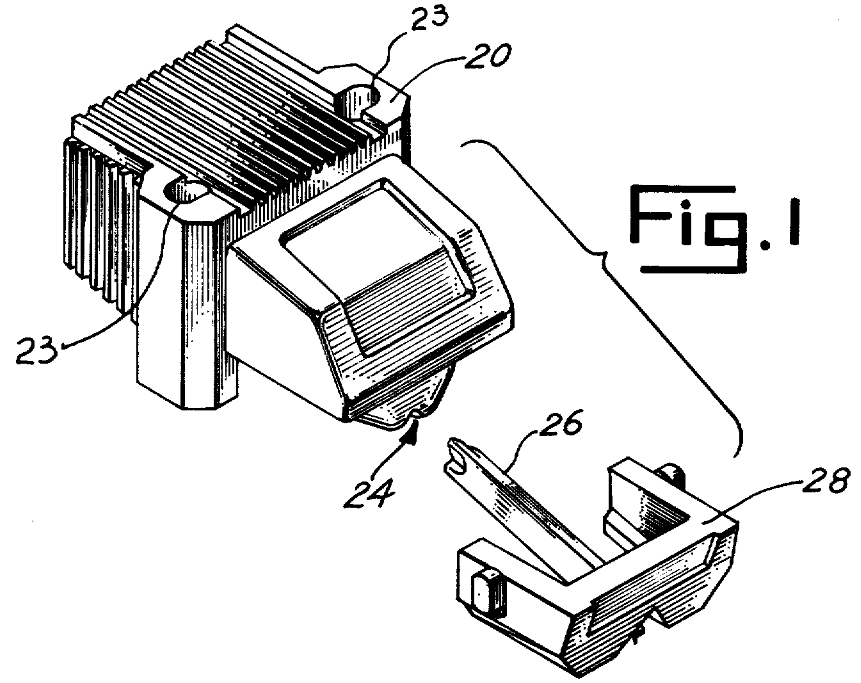
Fig. 1
Fig. 2
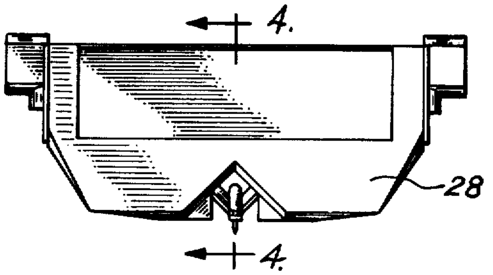
Fig. 4
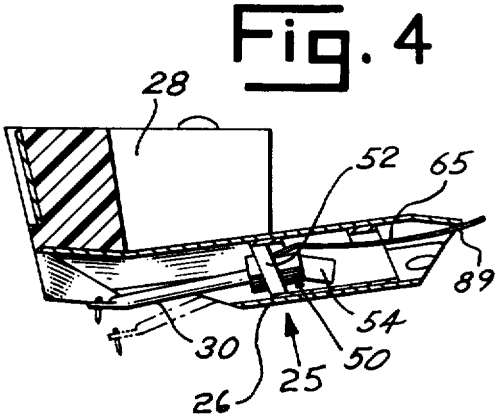
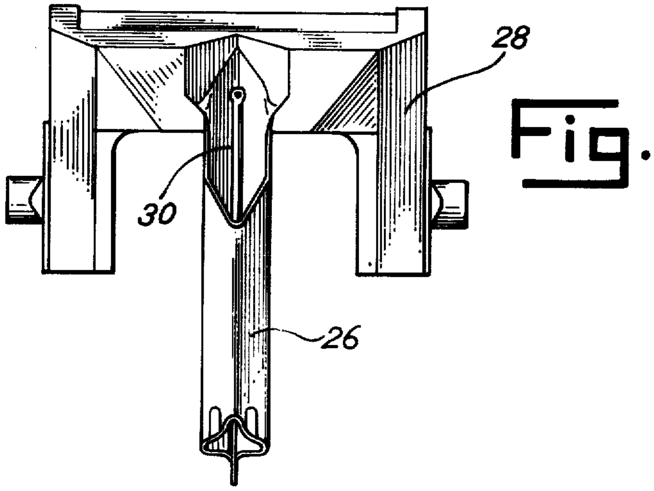
Fig. 3

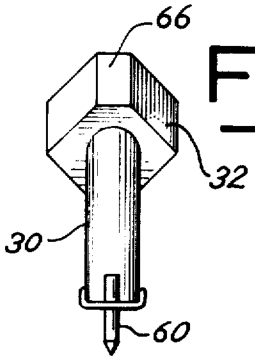
Fig. 5
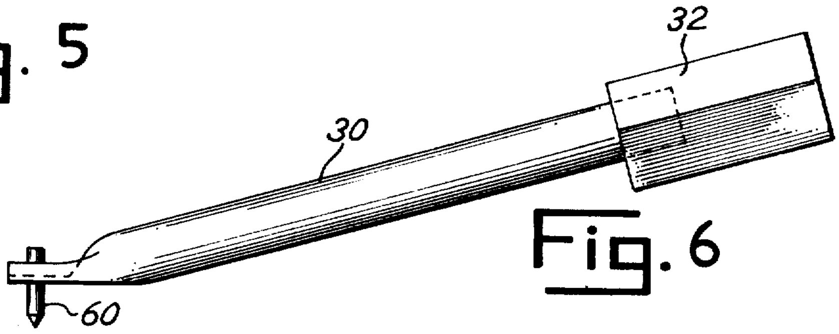
Fig. 6
Fig. 9
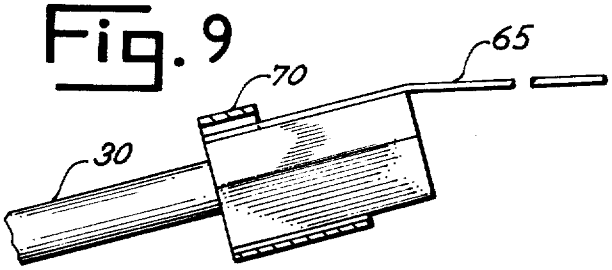
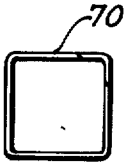
Fig. 7
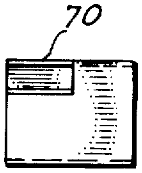
Fig. 8
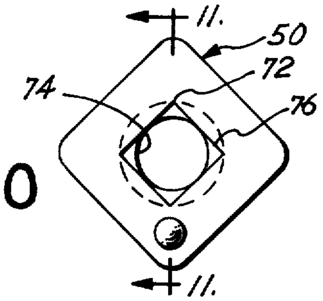
Fig. 10
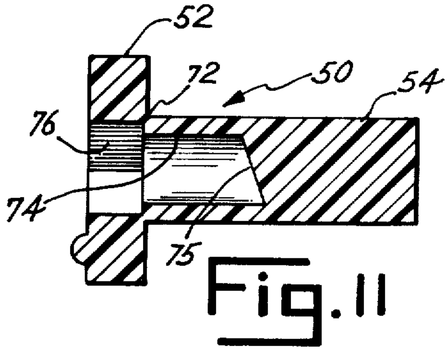
Fig. 11
Fig. 12
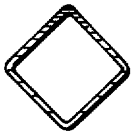
Fig. 13
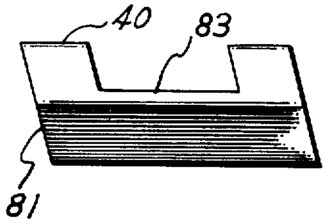
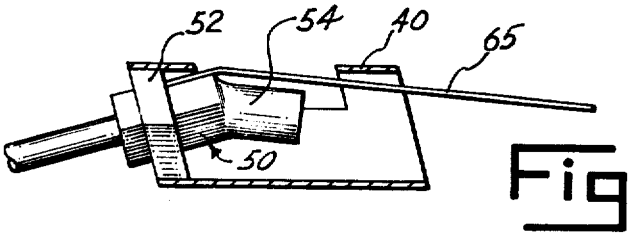
Fig. 14

Fig. 15
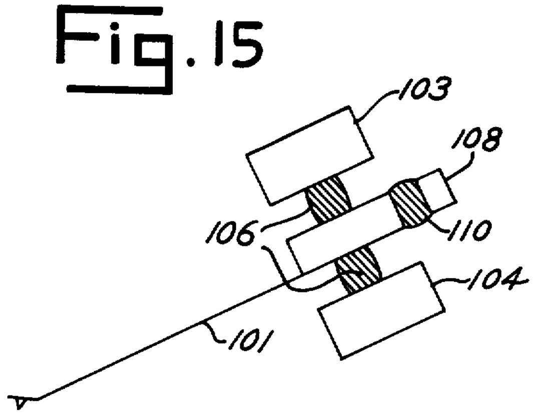
Fig. 16
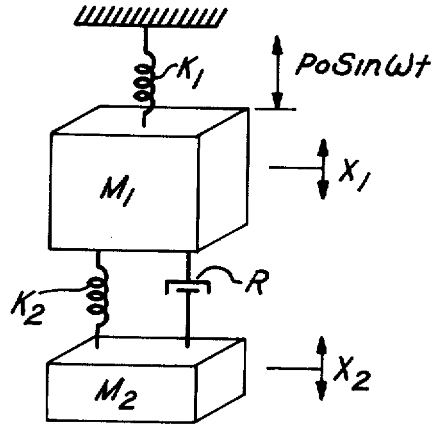
Fig. 17
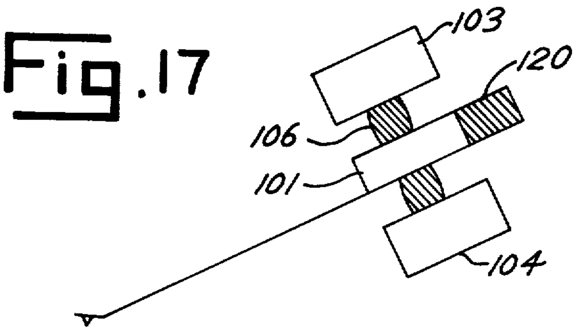
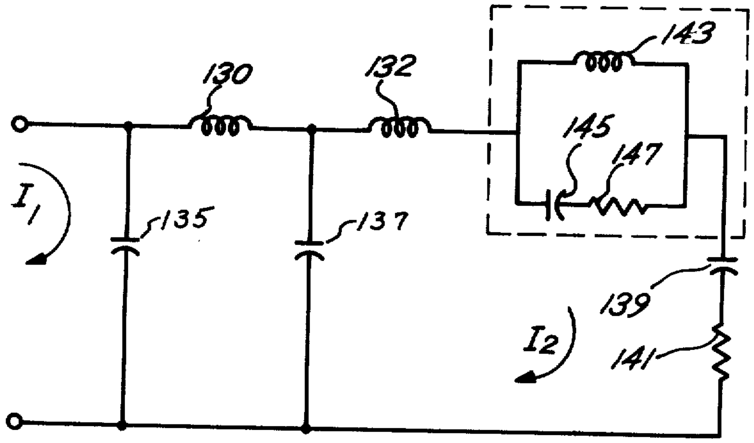
Fig. 18

PHONOGRAPH PICK-UP TRANSDUCER USING A ONE-PIECE BEARING AND INERTIAL DAMPER FABRICATED FROM DIFFERENT MATERIALS

BACKGROUND OF THE INVENTION

This invention relates to phonograph pickup transducers, and more particularly to the stylus assembly of such a transducer.

A phonograph pickup transducer senses sound which has been recorded as undulations in a groove cut into a recording surface. Today, flat disc records are almost universally used for entertainment purposes, although the surface of a drum, a flexible belt, and other surfaces can be and have been used.

As the grooved surface is moved with respect to the transducer, the undulations in the groove set the stylus into vibration and these vibrations are desirably an accurate reproduction of the original acoustic vibrations of the sounds recorded. The mechanical stylus vibrations are then converted into an electrical signal having a voltage which varies with the velocity of the mechanical vibrations. The resulting electrical signals can be amplified to drive a loudspeaker, modulate a radio signal, and so on.

A variety of devices may be used to convert the mechanical vibrations of the stylus into electrical signal variations: the stylus may vibrate a moving magnet to induce a time-varying voltage in a stationary coil; or vibrate a moving coil or armature positioned in a stationary magnetic field; or apply vibrating force to induce voltage fluctuations across a piezoelectric crystal or a ceramic element.

That portion of the mechanical-to-electrical transducer which is vibrated by the stylus will hereinafter be referred to as the "armature". The stylus, armature, and other vibrating portions of the transducer are here collectively referred to as the "moving system".

In all of the phonograph pickup systems noted above, the moving system must be supported and properly oriented, and the supporting arrangement which is used is crucial to the fidelity of the overall reproduction system.

First, the moving system and its support must provide high trackability.

"Trackability" indicates how well the stylus tip can follow the undulations in the record groove without losing contact with the groove's surfaces. To extract the recorded information from these undulations, continuous contact with both groove walls is essential. Loss of contact, called "mistracking", produces distortion which is particularly objectionable because, unlike other forms of distortion which may occur within the pickup, electrical signal shaping networks cannot compensate for the information lost.

Trackability can be improved by increasing the "stylus force" which urges the stylus tip against the recording surface or groove walls. Unfortunately, increased stylus force causes increased frictional wear, both on the stylus tip (which can be replaced) and on the record (which often cannot be replaced). Therefore, in order to limit damage to the record under prolonged use to acceptable levels, a low "stylus force", typically on the order of one gram, is desirable. The stylus support arrangement used should accordingly allow the stylus force to be easily adjusted to the desired level, and then maintained at that level.

To maintain trackability with a low stylus force, the rotational inertial mass of the moving system must be kept low. Thus, by reducing the size of the moving system, lower tracking forces may be used without decreasing trackability. Although physical and electrical considerations limit the extent to which the moving system can be miniaturized, the preferred moving system is quite small, complicating fabrication and assembly. It is therefore desirable that the arrangement used to support the stylus and armature be composed of a small number of simple, uncomplicated parts which may be easily, but precisely, assembled. Moreover, because the application and control of adhesives on tiny surfaces is very difficult, limiting the need for adhesives is most desirable.

The low rotational inertial mass of the moving system about its pivot can also be reduced through careful design. For example, a stereophonic moving magnet phonograph pickup having significant advantages is described in U.S. Pat. No. 3,077,521 which issued to E. Ahrens et al. In that arrangement, the stylus is attached to, and extends outwardly from, a permanent magnet. The stylus and armature are supported by an elastomeric bearing which surrounds the magnet positioning it for pivotal motion within a socket formed by the spaced-apart pole pieces of a magnetic coil.

As the frequency of vibration increases, however, the behavior of the moving system becomes much more complex. The moving system is itself a mechanical system that has resonances and these resonances can cause unacceptable distortion if not suppressed or controlled. Although the use of an elastomeric bearing to support the moving system does provide some vibrational damping, additional selective supression of unwanted vibrations at the resonant frequencies of the moving system is desirable.

Techniques for selectively damping the moving system of a transducer have been tried in the past. One such technique is described in U.S. Pat. No. 3,954,273 (Shaper et al—May 4, 1976). The techniques claimed in the Shaper et al patent are identical to those earlier explained in U.S. Pat. Nos. 1,996,104 and 2,031,948.

The present inventors employed the techniques described in U.S. Pat. Nos. 1,996,104 and 2,031,948 in a transducer sold more than one year ago in the United States. The transducer was like the one described in the drawings of this specification, except that member 50 was molded entirely from ENJAY Butyl HT. Although member 50 improved the damping characteristics of the moving system, the inventors have discovered that overall performance can be markedly increased by fabricating member 50 from two different materials, while retaining its one-piece molded construction.

SUMMARY OF THE INVENTION

In accordance with the invention, the stylus and armature of a phonograph pick-up transducer are resiliently supported for pivoting, vibratory movement by a single part which is shaped into two functional sections: the first is a support bearing section which positions the stylus while allowing it to pivot against an elastic return force; the second is a damping section which is held in contact with the stylus and armature, forms a part of the moving system, and functions as distributed mass, compliance and damping resistance tuned to suppress undesirable vibrations. The first part comprises butyl rubber mixed with 20 to 50 percent natural rubber. The second part comprises substantially all butyl rubber. By using this unique structure, it has been discovered that good high frequency damping characteristics and good overall trackability characteristics can be embodied in the same moving system to an extent not previously attainable.

BRIEF DESCRIPTION OF THE DRAWINGS

In the detailed description which follows, reference will be made to the drawings comprising the following figures:

FIG. 1 is a perspective view of a phonograph pick-up cartridge of the type in which the principles of the present invention can be used to advantage;

FIGS. 2 and 3 are end and bottom elevational views respectively of the removable stylus grip and housing portion of the cartridge shown in FIG. 1;

FIG. 4 is a cross-sectional view of the sytlus housing assembly taken along the line 4—4 of FIG. 2;

FIGS. 5 and 6 are end and side elevational views respectively of the stylus and armature;

FIGS. 7 and 8 are end and side plan views respectively of the spring wire binding ferrule;

FIG. 9 is a side view of the stylus, armature, spring wire and ferrule before the bearing block is attached, with the ferrule shown in cross-section;

FIGS. 10 and 11 are end and cross-sectional views respectively of the bearing block;

FIGS. 12 and 13 are plan views of the sleeve which receives the bearing block;

FIG. 14 is a partial cross-sectional view of the assembled transducer;

FIG. 15 depicts a pick-up transducer employing a "lumped" inertial damping mass elastically coupled to the armature;

FIG. 16 is a schematic of a simplified mechanical system employed to illustrate, by analogy, the behavior of the pick-up shown in FIG. 15;

FIG. 17 illustrates the principal components of the pick-up transducer employing a "distributed" inertial damping mass of the type contemplated by the present invention;

FIG. 18 is an electrical circuit having frequency response characteristics analogous to those of the transducer of FIG. 17;

DESCRIPTION OF THE PREFERRED EMBODIMENT

Figure 19:
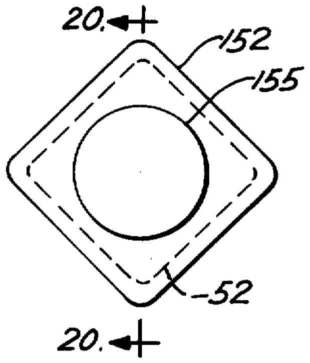
FIG. 19 is an end elevational view of a preferred form of mold for preforming a first step during the molding of member 50.

The present invention is an improved stylus and armature mounting arrangement which is easy to fabricate and assemble, even when greatly miniaturized, yet which provides high trackability, facilitates tracking force adjustment, and introduces inertial damping to selectively suppress undesirable vibrations at the moving system's mechanical resonance frequencies.

The principles of the present invention may be used to particular advantage in the construction of a phonograph pickup cartridge of the kind shown in the perspective view of FIG. 1. The main body of the cartridge, indicated generally at 20 is attached to the end of a tone arm by screws extending through mounting holes 23. The cartridge housing 20 includes a ferromagnetic shield which isolates the pickup coil and pole-piece structure within the housing from ambient electromagnetic noise (such as 60-cycle "hum"). A single opening 24 provides an entry to a passageway having a square-shaped cross-section into which the enlongated stylus housing 26 may be inserted. The outer end of the stylus housing 26 is attached to a stylus grip 28 which simultaneously protects the stylus shank 30, and provides a more convenient finger hold to remove and replace the entire stylus assembly.

The stylus tip indicated at 60 in FIGS. 5 and 6 is formed from a hard durable metal or gemstone which is pressed through the flattened end of the stylus shank 30. Stylus shank 30, which is preferably formed from a light-weight metal, such as aluminum alloy, is in turn pressed into a cylindrical socket in the permanent magnet 32.

A spring wire 65 is held against the upper beveled corner (seen most clearly at 66 in FIG. 5) of the magnet 32 by means of a crimped ferrule 70.

As contemplated by the present invention, the stylus shank 30 and a magnet armature 32 are resiliently supported for vibratory movement with respect to a mounting sleeve 40 by means of a single part (indicated generally at 50 in FIG. 4).

The unitary part 50 has two sections. The first section, seen at 52 in FIG. 4, functions as a support bearing which positions the stylus while allowing it to pivot against the elastic return force which the bearing supplies.

The second section 54 functions as an inertial damping mass and is held in contact with the magnet armature 32.

To assemble the pickup, the spring wire 65 is pressed through a thin wall section (indicated at 72 in FIGS. 10 and 11) of the bearing member 50. The bearing member 50 is slipped over the magnet to the position shown in FIG. 14.

The socket within the bearing 50 includes a cylindrical section 74 which terminates at an angled end wall 75, and a mouth section 76 having a square cross-section. The square socket section 76 conforms to and aligns the magnet 32 and ferrule 70. The smaller, cylindrical section 74 elastically stretches over the square magnet which is pressed against the angled end wall 75, stretching the upper cylindrical wall at 74 so that the cantilevered inertial damping section 54 is deflected downward and at an angle to the axis of magnet 32 and shank 30 so as to be clear of the spring wire 65 and to maintain mechanical contact between the end surface of the magnet 32 and the end wall 75 of the bearing block. The bearing block 50 is then pressed into the sleeve 40 as shown in FIG. 14, the bearing section being inclined to coincide with the inclined leading edge 81 of the sleeve 40. As seen in FIGS. 13 and 14, a cut-out 83 in sleeve 40 provides the clearance needed to allow the spring wire 65 and the bearing block 50 to vibrate freely without touching the side-walls of the sleeve 40.

The assembly shown in FIG. 14, which is constructed without the use of adhesives, is then inserted into the stylus housing 26 as shown in FIG. 4. With the stylus unloaded, the spring wire 65 is soldered to the housing 26 at point 89 seen in FIG. 4.

By integrating the bearing and inertial damping functions in a single molded part, fabrication and assembly of the transducer is greatly simplified. The deformability of the part 50 provides the needed resilient support for the moving system and allows the bearing section to be compressed, providing a secure "press-fit" attachment without requiring adhesives. Similarly, the elastic nature of the elastomer allows it to be stretched over the magnet 32 to place the side-walls under tension and hold the inertial damping section 54 in tight contact with the remainder of the moving system.

The vibrational behavior of the phonograph pick-up which has been described is a complex function of many parameters. A better understanding of that behavior may be obtained by resorting to the use of simplified electrical and mechanical analogs of the preferred arrangement.

FIG. 15 of the drawings illustrates a simplified arrangement in which a stylus armature 101 is supported between the pole pieces 103 and 104 by an elastomeric bearing 106. An auxiliary damping mass 108 is attached to the armature 101 by an elastomeric coupling 110.

FIG. 16 is a schematic of a mechanical analog of the simplified structure shown in FIG. 15. In the simplified form of FIG. 16, the pick-up is depicted as comprising a main vibrating mass $M_1$ (corresponding to the armature) which is coupled to a fixed point by the spring $K_1$ (corresponding to the support bearing 106), and a damping or absorber mass $M_2$ (corresponding to the damping mass 108 of FIG. 15) which is coupled to the mass $M_1$ by the spring $K_2$ (corresponding to the elastomeric coupling 110). The coupling 110 of FIG. 15 also provides damping resistance to the system as indicated by the dashpot R in FIG. 15. The vibrational behavior of the simplified arrangement of FIG. 16 may be described by the following differential equations:

$$M_1\ddot{X}_1 + R(\dot{X}_1 - \dot{X}_2) + K_1X_1 + K_2(X_1 - X_2) = P_0\sin \omega t$$

$$M_2\ddot{X}_2 + R(\dot{X}_2 - \dot{X}_1) + K_2(X_2 - X_1) = 0$$

Where:

$M_1$ = Mass of vibrating system
$M_2$ = mass of dynamic absorber
R = Damping in the absorber system
$K_1$ = Stiffness of vibrating system
$K_2$ = Stiffness of absorber system
$X_1$ = Displacement of main mass
$X_2$ = Displacement of absorber mass
$P_0 \sin \omega t$ = Force applied The auxiliary damping mass $M_2$ and its associated spring $K_2$ constitute a resonant damping system. When the frequency of the applied vibratory force is well below the resonance of the damping system, the two masses $M_1$ and $M_2$ move together and little damping occurs. In contrast, when the frequency of the applied force is well above the resonance of the damping system, the damping mass behaves as if it were fixed in space, resulting in a force on the dashpot R which damps the vibration of the main mass $M_1$.

By tuning the damping system to resonate slightly below the resonance frequency of the main system, the damping mass can be made to move out of phase with the main mass at resonance, thereby amplifying the damping effect. In this way increased damping may be applied where it is most needed in a phonographic pickup: at the natural resonance frequency of the stylus and magnet.

In accordance with a further feature of the present invention, it has been found that increased damping may be achieved through the use of an inertial damping body monolithically formed from a high damping elastomer (such as ENJAY butyl HT). The elastomeric damping member acts as a member having distributed elements of mass, compliance and damping resistance, and provides improved performance over a "lumped" mass arrangement of the type illustrated in FIG. 15.

A simplified pickup employing this principle is illustrated in FIG. 17 and its vibrational behavior is analogous to the frequency response of the electrical network shown schematically in FIG. 18.

As in the simplified illustrative example of FIG. 15, the armature 101 is elastically supported by the bearing 106 for vibratory motion with respect to the pole-pieces 103 and 104. The "lumped mass" 108 and elastic coupling 110 seen in FIG. 15 are, however, replaced by the single cantilevered rod 120 shown in FIG. 17. The rod is formed from a high damping elastomer and is tuned to have a resonance frequently approximately equal to (and preferably slightly lower than) the resonance frequency of the armature 101. The resonance frequency for a cantilevered bar (clamped at one end and free at the other) is given by the equation:

$$f=(KR/l^2)[Q/d]^{\frac{1}{2}}$$

Where:

K = Numerical constant
l = Length of the bar
Q = Young's modulus of the material
R = Radius of gyration of the bar
d = Density of the bar.

Thus, the resonance frequency of the bar may be increased by shortening the bar or increasing its thickness. The Young's modulus and density of the bar are determined by the selection of the material which should be, as noted earlier, a high damping elastomer.

A better understanding of the influence that the damping member has on the frequency response of the pick-up may be obtained by considering FIG. 18 of the drawings. As shown there, the inertia represented by the tip-end and magnet end of the stylus armature are represented by the inductances 130 and 132 respectively. The compliance of the tip-to-record junction, of the stylus, and of the bearing are electrically represented by the capacitances 135, 137, 139 respectively. Resistor 141 represents the viscous damping resistance of the bearing. The distributed mass, compliance and damping resistance of the cantilevered damping elastomer are respresented in FIG. 18 by the inductance 143, the capacitance 145 and the resistance 147. The recorded (input) velocity is represented by the current $I_1$ while the output velocity of the stylus is represented by the current $I_2$.

Clearly, the bandwidth or dynamic range of the pickup can be increased by reducing the effective mass of the moving system (represented by the inductances 130 and 132). A practical limit exists, however, as the stylus becomes too fragile or the electrical output signal becomes too low to be useful. Undesirable resonance within the range of the pick-up may be selectively attenuated, as has been described, by tuning the distributed mass, compliance and damping resistance of the cantilevered elastomer which, in the electrical analog of FIG. 18, may be seen to act as a tuned "trap" circuit.

Figure 20:
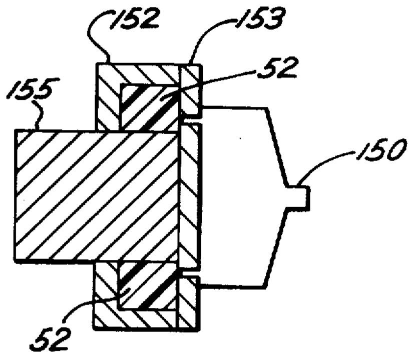
FIG. 20 is a cross-sectional view taken along line 20—20 of FIG. 19.
Figure 21:
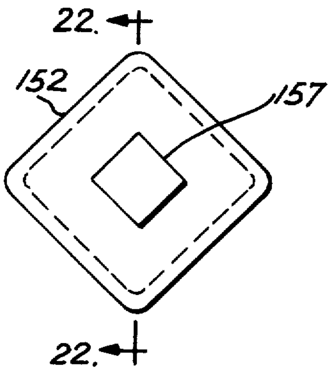
FIG. 21 is an end elevational view of a preferred form of mold for performing a second step during the molding of member 50.
Figure 22:
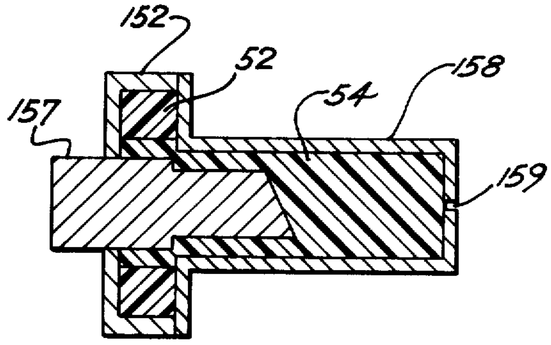
FIG. 22 is a cross-sectional view taken along line 22—22 of FIG. 21.

In order to fabricate member 50 from two different materials, a new two step molding process has been developed. In the first step, as shown in FIGS. 19 and 20, a mixture of 65 percent butyl rubber and 35 percent natural rubber and curing agents is forced in the mold cavity defined by gate 150, front mold plate 152, rear mold plate 153 and removable pin 155. First bearing section 52 thus is molded and then is partially cured by a conventional bromide curing process. Referring to FIGS. 21 and 22, in the second step of the process, a different pin 157 and a different rear plate 158 are substituted for pin 155 and plate 153. Substantially 100 percent butyl rubber then is forced through a gate 159 in order to form damper section 54 of member 50. The entire member 50 then is cured into a integrated one-piece structure. As a result of this unique process, section 54 is fabricated from a highly damping elastomer and section 52 is fabricated from an elastomer exhibiting less damping and more compliance than section 54. Fillers, of course, also may be used in the rubber composition of sections 52 and 54 depending on the type of performance desired.

It is to be understood that the preferred stylus support and damping structure which has been described is merely illustrative of one application of the principles of the invention. Numerous modifications may be made without departing from the true spirit and scope of the invention.

By using the unique structure described in this specification, all of the advantages of one-piece construction can be preserved and, at the same time, good trackability can be obtained for a wider temperature and frequency range.

What is claimed is:

1. In a phonograph pick-up, an improved arrangement for resiliently supporting a stylus armature for vibratory motion with respect to a relatively fixed structure while suppressing unwanted vibrations in said stylus armature which comprises, in combination:

a receiving socket in said structure and a one-piece elastomeric member comprising an annular bearing section fabricated from butyl rubber mixed with 20 to 50 percent natural rubber and a cantilevered inertial damping section fabricated from substantially all butyl rubber said annular bearing section surrounding said stylus armature and being inserted under compression into said socket, and said damping section being stretched over said armature and held in contact therewith.

2. The arrangement of claim 1 wherein said bearing section comprises about 65 percent butyl rubber and about 35 percent natural rubber.

3. In a phonographic pick-up transducer, an improved arrangement for supporting the combination of a stylus arm and a magnet attached thereto which comprises, in combination:

a support socket for receiving said magnet and a one-piece elastomeric member stretched over said magnet, said member being shaped to form both an annular bearing section fabricated from butyl rubber mixed with 20 to 50 percent natural rubber and a cantilevered inertial-damping section, fabricated from substantially all butyl rubber, said annular bearing section being inserted under compression within said socket to resiliently support said stylus arm and magnet for vibratory motion with respect to said support socket and said inertial-damping section being mechanically coupled to said magnet to suppress undesirable vibrations at the resonance frequencies of said stylus arm and magnet.

4. The arrangement of claim 3 wherein the bearing section comprises about 65 percent butyl rubber and about 35 percent natural rubber.

5. In a phonograph pick-up system, combined mounting and damping means for resiliently supporting the combination of an elongated stylus and a movable permanent magnet for controlled vibratory motion, said mounting and clamping means comprising, in combination:

a pick-up coil and pole piece structure, a tubular support sleeve rigidly positioned within said coil and pole piece structure, and a one-piece bearing and damping member comprising an outwardly extending damping section fabricated from a high damping elastomer and an annular bearing section fabricated from an elastomer exhibiting less damping and more compliance than the elastomer comprising the damping section, said annular bearing section having an outer wall shaped to conform to and be held by the inner wall of said sleeve and having a hollow interior forming a socket which receives, conforms to and secures said stylus and magnet, said damping section being an inertial damping body which is held in mechanical contact with said magnet and which has a resonance frequency approximately equal to that of the combination of said stylus and magnet.

6. The arrangement of claim 5, wherein the bearing section comprises butyl rubber mixed with 20 to 50 percent natural rubber and wherein the damping section comprises substantially all butyl rubber.

* * * * *